United States Patent [19]

Davis et al.

[11] Patent Number: 5,748,438
[45] Date of Patent: May 5, 1998

[54] ELECTRICAL ENERGY STORAGE DEVICE HAVING A POROUS ORGANIC ELECTRODE

[75] Inventors: James L. Davis, Coral Springs; Melanie Williams, Deerfield Beach; Robert W. Pennisi, Boca Raton, all of Fla.

[73] Assignee: Motorola, Inc., Schaumburg, Ill.

[21] Appl. No.: 351,983

[22] Filed: Dec. 8, 1994

(Under 37 CFR 1.47)

Related U.S. Application Data

[63] Continuation-in-part of Ser. No. 131,225, Oct. 4, 1993, abandoned.

[51] Int. Cl.[6] .............................. H01G 9/02; H01G 9/00; H01M 4/02
[52] U.S. Cl. .......................... 361/504; 361/503; 361/508; 361/516; 361/502; 429/29; 429/40; 429/46; 429/188; 429/209
[58] Field of Search .................... 361/502–504, 361/508, 516–517, 523, 525, 528, 532; 429/12, 27–29, 40–42, 46, 128, 188, 208, 209, 218; 252/62.2

[56] References Cited

U.S. PATENT DOCUMENTS

| | | | |
|---|---|---|---|
| 3,383,247 | 5/1968 | Adlhart | 502/101 |
| 3,793,060 | 2/1974 | Weininger | 117/98 |
| 4,029,854 | 6/1977 | Walsh | 429/27 |
| 4,184,192 | 1/1980 | Yoshida et al. | |
| 4,653,281 | 3/1987 | Anderman | 429/209 |
| 4,720,400 | 1/1988 | Manniso | 427/243 |
| 4,853,305 | 8/1989 | Anderman | 429/212 |
| 5,188,890 | 2/1993 | Ohashi | 428/306.6 |

*Primary Examiner*—Bot L. Ledynh
*Attorney, Agent, or Firm*—Dale W. Dorinski

[57] ABSTRACT

An ultracapacitor having two porous organic membrane electrodes is made from microporous polymer substrates (10). The surface of the polymer substrate and the walls of the micropores (30) are coated with metal oxides. Both sides of the substrate can be coated with the conductive materials. The film can be a carboxylic ion-exchange material dispersed in a microporous copolymer matrix, and the film can be supported on a woven nylon substrate. The two electrodes (82, 84) are situated substantially parallel to each other, with the coated surface of one electrode facing the coated surface of the other electrode. An ionic electrolyte solution (89) fills the gap (86) between the electrodes.

11 Claims, 5 Drawing Sheets

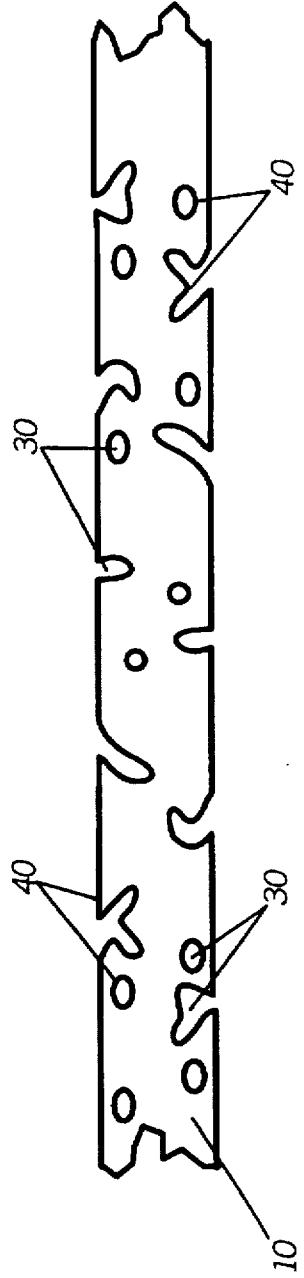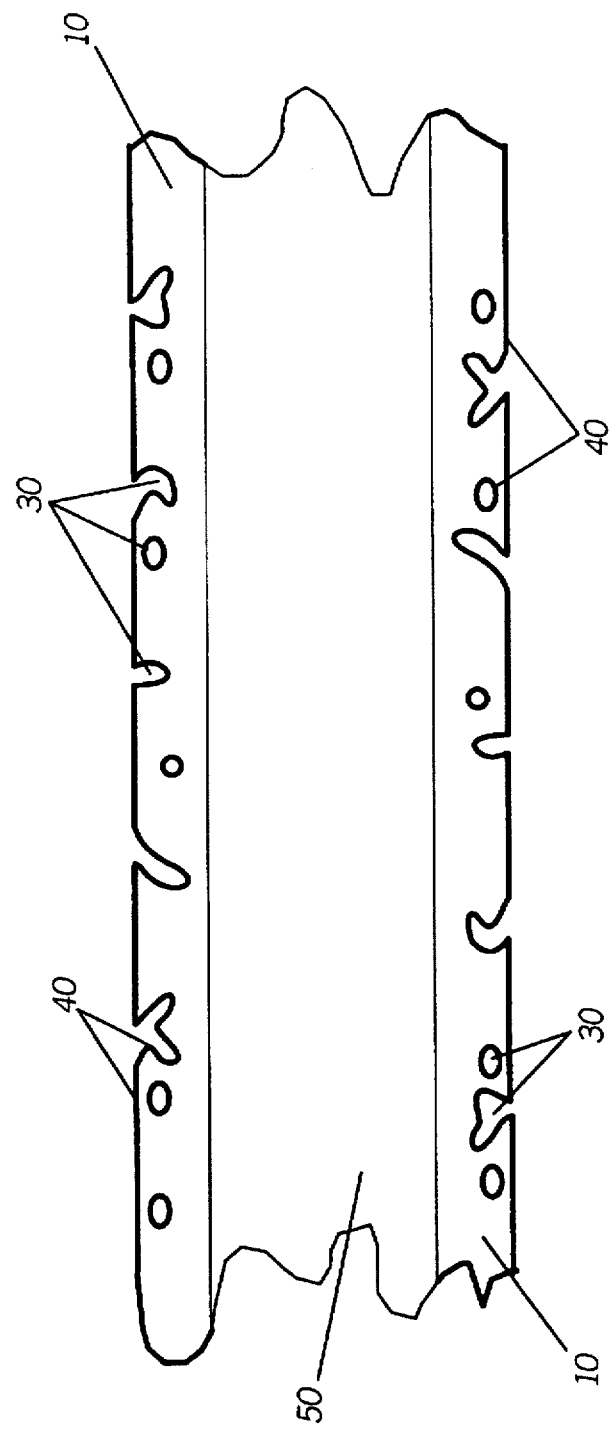

4,748,438

ELECTRICAL ENERGY STORAGE DEVICE HAVING A POROUS ORGANIC ELECTRODE

CROSS REFERENCE TO RELATED APPLICATIONS

This application is a continuation-in-part of U.S. application Ser. No. 08/131,225 filed Oct. 4, 1993, by Davis, et al., entitled "Porous Organic Electrode for an Electrical Energy Storage Device," assigned to Motorola, Inc., and now abandoned.

TECHNICAL FIELD

This invention relates in general to electrical energy storage devices and more particularly to capacitors with porous organic electrodes.

BACKGROUND

Electrical energy storage devices, such as capacitors, store electrical charge on an electrode. Other devices, such as electrochemical cells or batteries, utilize the electrode to create, by chemical reaction, an electrical charge at the electrodes. In both of these applications, the ability to store or create electrical charge is a function of the surface area of the electrode. For example, in capacitors, greater electrode surface area increases the capacitance or energy storage capability of the device. A third type of storage device, the ultracapacitor, relies on the microscopic charge separation at an electrochemical interface to store energy. Since the capacitance of these devices is proportional to the active electrode area, increasing the electrode surface area will increase the capacitance, hence increasing the amount of energy that can be stored. This achievement of high surface area utilizes materials such as activated carbon or sintered metal powders. However, in both situations, there is an intrinsic limit to the porosity of these materials, that is, there is an upper limit to the amount of surface area that can be attained simply by making smaller and smaller particles. An alternative method must be developed to increase the active electrode surface area without increasing the size of the device. A much more highly efficient electrode for electrical energy storage devices could be realized if the surface area could be significantly increased.

BRIEF DESCRIPTION OF THE DRAWINGS

FIG. 6 is a cross sectional view of an electrode used in embodiments of the invention.

FIG. 7 is a cross sectional view of another embodiment of an electrode used in accordance with the invention.

DETAILED DESCRIPTION OF THE PREFERRED EMBODIMENT

Figure 1:
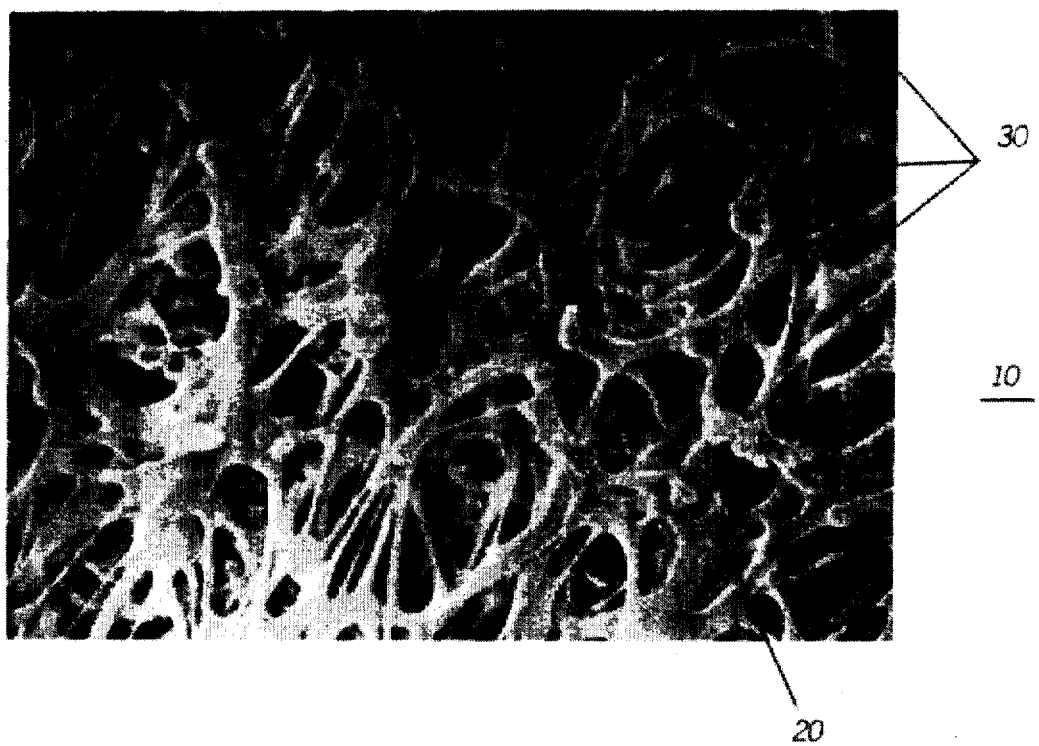
FIGS. 1–4 are photomicrographs of microporous membranes used in embodiments of the invention.
Figure 2:
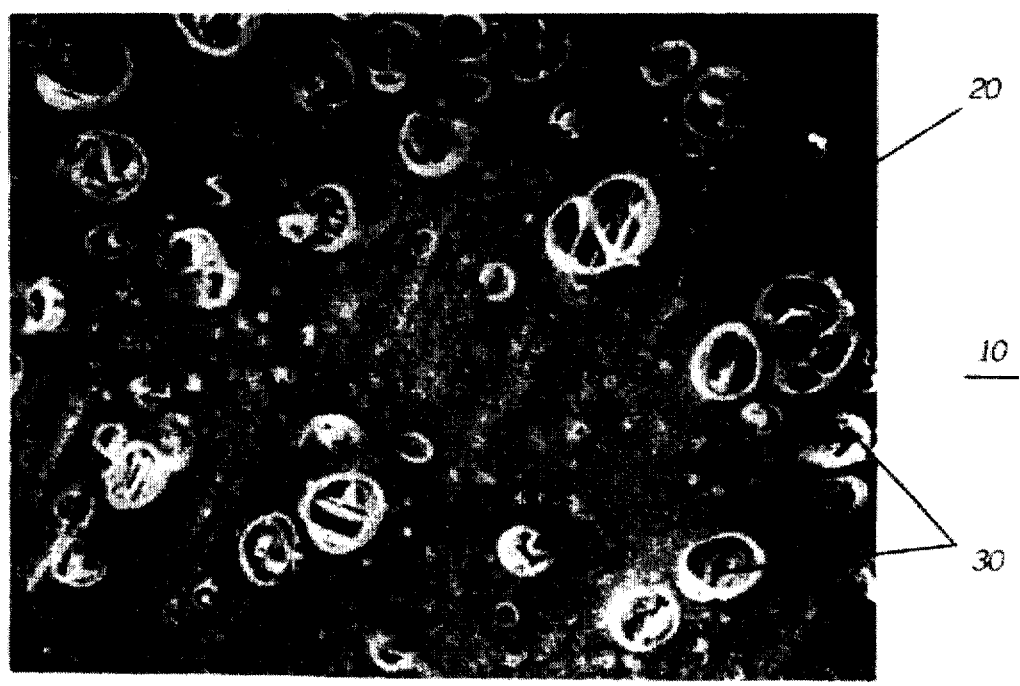
Figure 3:
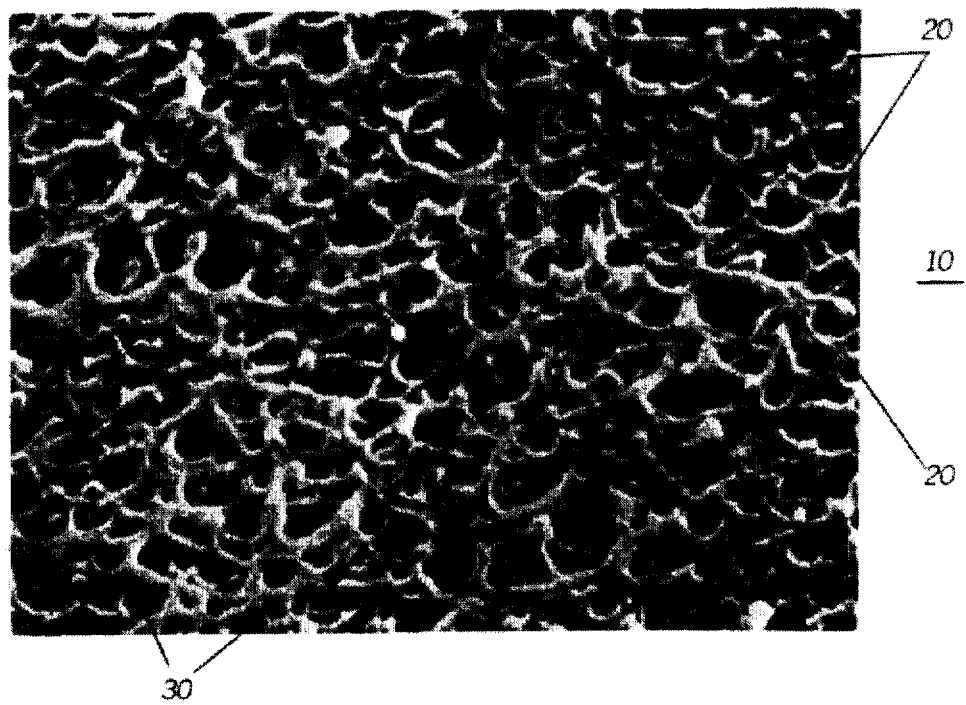
Figure 4:
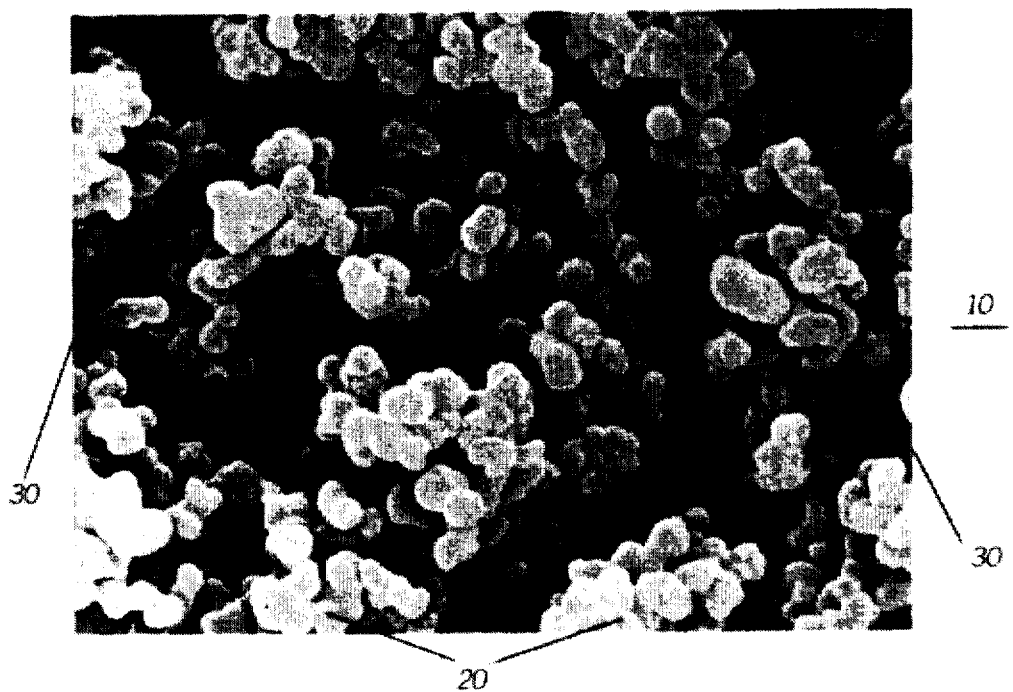

While the specification concludes with claims defining the features of the invention that are regarded as novel, it is believed that the invention will be better understood from a consideration of the following description in conjunction with the drawing figures, in which like reference numerals are carried forward.

Referring now to FIGS. 1–4, a microporous membrane 10 is composed of a plastic film 20 with numerous pores or holes 30 of controlled size. The number of holes in a unit area is extremely large, such that about eighty percent of the volume of a membrane is air or "void" space. The size of the pores determines, in a large part, the surface area of the membrane. Membranes are not composed of fibers as in conventional high surface area substrates, but are typically polymeric films. These micropores or holes, being extremely small, provide a very high void volume in the membrane. Microporous membranes are often used as extremely fine filters for liquids. Typical pore sizes for a microporous membrane range from 0.1 to 0.8 microns.

Microporous membranes can be constructed from materials as widely diverse as ceramics or polymers. Typically, polymers used to create microporous membranes are polysulphones, acrylics, fluorinated polymers, cellulose esters, polypropylene, polyvinyllidineflouride, polyvinyl chloride, polytetrafluoroethylene, polymethylpentene, nylon, vinyl/acrylic co-polymers, nitrocellulose, polystyrene divinylbenzene copolymers, polyethylene, and NOMEX® (an aromatic nylon available from E.I. DuPont de Nemours Co. of Wilmington, Del.). Pore sizes can be up to ten microns and as small as 0.1 microns.

The microporous polymer membrane 10 has a main polymeric structure 20 and a vast number of microporous or microscopic openings 30 within the polymer structure. Although the microporous membrane 10 has a large number of openings 30, their extremely small size makes them quite amenable to being clogged or packed with foreign material. Therefore, in order to effectively utilize the high surface area of the microporous membrane for an electrode, the polymer structure 20 must be carefully coated with an extremely thin coating of material to prevent closing the pores and reducing the effective surface area.

In order to use the membrane as an electrode for an electrical energy storage device, it must be coated with a material that exhibits electrical conductivity. The membranes can be coated with any number of desired electrode materials, including but not limited to, metals, metal oxides, metal sulfides, metal chlorides, metal nitrides, organometallics, conductive polymers, carbon, and fullerenes. The membrane serves as a support to disperse the active electrode material as widely as possible, thus increasing the available capacitance to the device without sacrificing size. The membrane material is coated with an active electrode material using any one of a number of common deposition techniques, including but not limited to, vacuum techniques such as sputtering, plasma polymerization, plasma-enhanced chemical vapor deposition, liquid phase chemical vapor deposition, molecular beam epitaxy, evaporation, or other techniques such as solution coating, electroless plating, or pyrolitic spraying may also be used. Vacuum techniques are preferred because they provide the ability to place a controllable, extremely thin layer on the polymer structure 20. For example, coatings in the range of 50–10,000 Ångstroms can quite easily be placed on the structure, making it electrically conductive.

Some microporous membranes that are particularly amenable to use as an electrode are materials from Gelman Sciences of Ann Arbor, Mich. One such material is NFWA, consisting of a uniform dispersion of a carboxylic ion exchange material in a microporous acrylic co-polymer matrix. This matrix is supported or cast on a nylon substrate. Other materials useful for this application are FP-450, FP-200 and FP-VERICEL®, also obtained from Gelman Sciences. Each membrane should be chosen for the specific application to be employed with considerations made regarding the amount of surface area, the pore size diameter, the compatibility with any electrolyte solutions, compatibility with desired electrode materials, and wettability by the desired electrolyte.

Specific examples of electrodes and electrical energy storage devices made in accordance with this invention will now be reviewed. The electrodes were created by sputter depositing a metal onto the microporous membrane. In the case of one embodiment, tungsten and/or tantalum are deposited onto the membrane materials. The thickness of the deposited metal films ranges from about 100 to about 1000 ÅAngstroms. The films were deposited using DC sputtering equipment and tungsten or tantalum cathodes, with plasma power of about 150–200 watts. Oxide and carbide films of tantalum and tungsten were deposited by reactive sputtering. Oxygen (to produce the metal oxide) or ethylene ($C_2H_4$) (for the metal carbide) was introduced into the plasma during deposition.

Metallic tungsten films were deposited at room temperature in the sputtering system by using pure argon at a deposition rate of 5–6 Ångstroms per second. X-ray diffraction studies of the metallic tungsten film revealed that it was an amorphous structure. In general, films less than 2000 Ångstroms thick exhibited excellent adhesion, while films thicker than 2000 Ångstroms exhibited marginal adhesion.

Oxide films of tungsten were deposited in a mixed argon/oxygen environment. The oxygen was introduced into the plasma near the substrate. Deposition rate was typically 4–6 Ångstroms per second. X-ray photoelectron spectroscopy (XPS) analysis of the oxide film revealed it to be $WO_3$ with a color of medium to dark blue.

Carbide films of tungsten were produced using a mixed argon/ethylene environment similar to the method used to prepare the oxide films but at a deposition rate of 1–2 Ångstroms per second. Analysis of the resulting film provide clear evidence of the formation of tungsten carbide (WC).

Tantalum metal, tantalum oxide and tantalum carbide film were produced in a manner similar to that used for tungsten.

Figure 5:
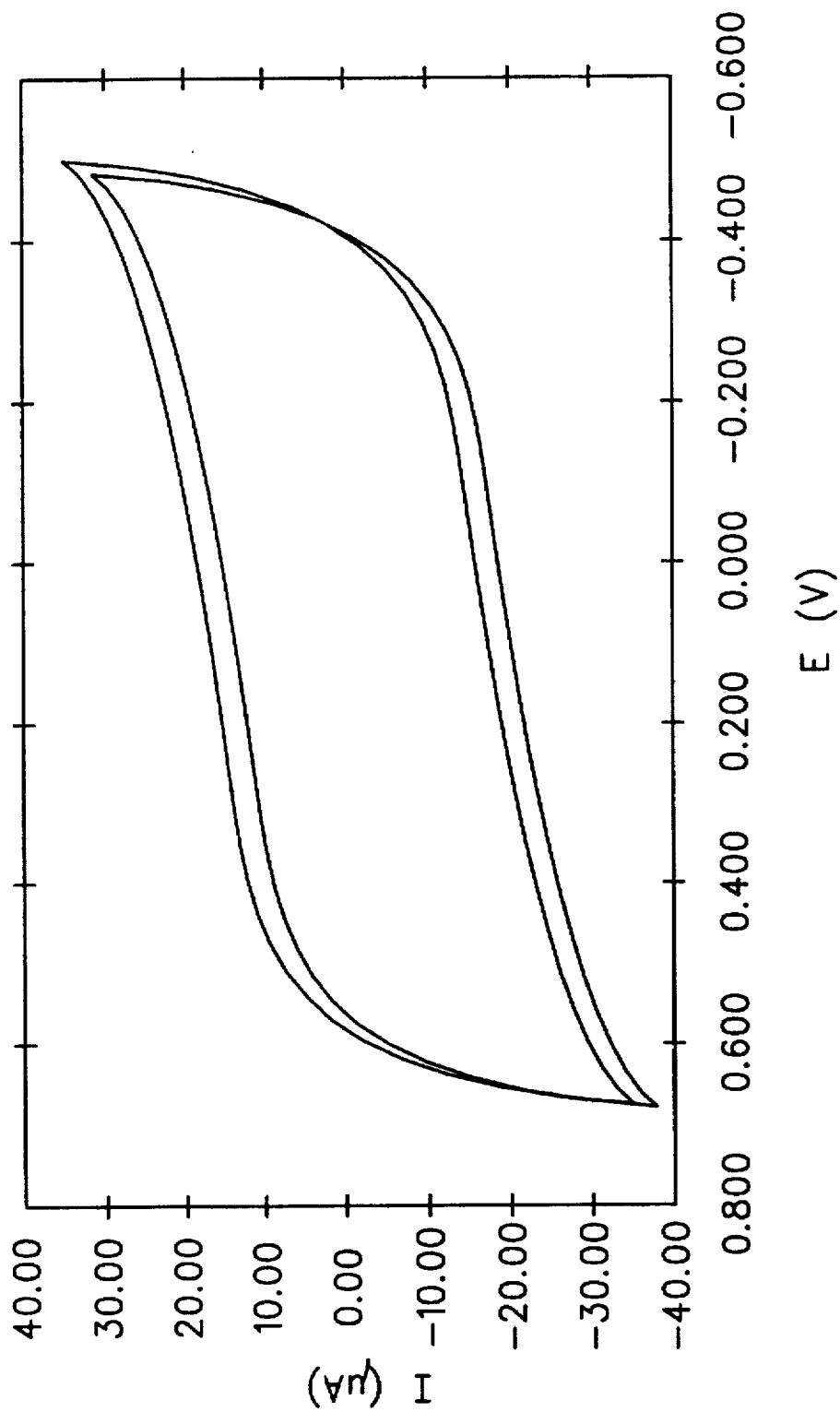
FIG. 5 is a cyclic voltammogram of an electrochemical cell having an electrode prepared in accordance with the invention.

The metal coated membranes were then used as a working electrode in a three-electrode cell. The auxiliary electrode was platinum and the reference electrode was a silver/silver chloride couple. The electrolyte for the electrodes was 0.5 molar $H_2SO_4$. Cyclic voltammic studies of the cell were conducted at a sweep rate of 50 millivolts per second. Referring now to FIG. 5 (a graph of the cyclic voltammetry of an electrode with 200 Ångstroms of tantalum deposited on FP-200 microporous membrane), the electrode was cycled over fifteen hundred times without detectable performance degradation. The charge stored on the electrode surfaces were found to be around 1 millicoulomb.

Microporous electrodes appear to exhibit much higher charge storage when compared to electrodes made on conventional thin films that are not microporous. For example, in studies of pure tantalum foils, the maximum current observed in a similar cell configuration was about 12 microamps. However, using the FP-200 microporous substrate, currents as high as 50 microamps were observed. This increase in current capability is most likely the result of increasing the available surface area of the metal film. Both the NFWA and FP 200 membrane surfaces are extremely porous and vacuum deposited thin films retain this porosity. These findings provide clear proof that depositions of thin film on porous materials such as the microporous membranes can increase the current carrying capacity of an electrode.

Evaluation of the tungsten films showed similar behavior. However, the electrodes began to degrade significantly after several hundred cycles. It is postulated that the tungsten metal is not as compatible with NFWA as the tantalum metal is with the FP-200. However, the results clearly indicate that higher current carrying capability can be exhibited when using microporous substrates.

Referring now to FIG. 6, additional configurations can coat both sides of the membrane 10 with the conductive material 40. The membrane 10 can also be supported on a substrate 50, such as woven or non-woven nylon (FIG. 7). Also, the second side of the membrane 10 might be coated with another material, such as aluminum, titanium, copper, tungsten, or nickel, in order to serve as a current collector. These microporous film electrodes may then be stacked, using a separator, in order to create a very small structure for a multi-electrode energy storage device. By using electrode materials such as rhodium or iridium, electrodes that exhibit pseudocapacitance may be obtained. In this way, the high surface area electrode can be combined with the pseudocapacitance phenomena to create an electrical energy storage device that exhibits a significantly higher ability to store charge than conventional devices.

The coated membrane finds exemplary use as an electrode for an ultracapacitor. Ultracapacitors are a new breed of energy storage devices that are completely distinctive from batteries. These devices are true capacitors in that energy is stored by the separation of positive and negative charges. However, unlike traditional capacitors such as parallel plate capacitor, ultracapacitors store charge at the atomic level between the electrode and the electrolyte. This charge storage mechanism is highly efficient and can produce high capacitances up to several hundred Farads in a compact package. The ultracapacitor can use electrodes of one or more oxides of ruthenium, tantalum, rhodium, iridium, cobalt, nickel, molybdenum, tungsten or vanadium coated on a porous substrate.

Ultracapacitors store energy by two processes. The first is the separation of positive and negative charges at the interface between the electrode and the electrolyte. This phenomenon is called double layer capacitance. The electrical double layer is present at virtually all interfaces between electrodes and electrolytes and is a fundamental property of electrochemical systems. The double layer consists of sorbed ions that are specifically sorbed on the electrode from solution as well as solvated ions. The proximity between the electrode and solvated ions is limited by the presence of the solvation sheath 16 around the ions, hence, the solvated ions cannot sorb on the electrode and only approach to some distance d. Therefore, in the case of these solvated ions, there exists positive and negative charges separated by a distance d, which produce a true capacitance in the electrical sense. The second charge storage mechanism is the sorbtion of ions on the surface of the electrode. This phenomenon is called pseudocapacitance. The key point to note is that pseudocapacitance is not an electrostatic capacitance like that of the double layer or such as occurring in a parallel plate capacitor. Hence, the term "pseudo" (meaning false) capacitance. Instead, pseudocapacitance is merely a convenient formalism used to express the phenomenon of ion adsorption on electrodes. The physical processes involved in energy storage in an ultracapacitor is distinctly different from the electrochemical oxidation reduction processes responsible for charge storage in batteries. Hence, these devices represent a class of energy storage materials completely separate from batteries.

Figure 8:
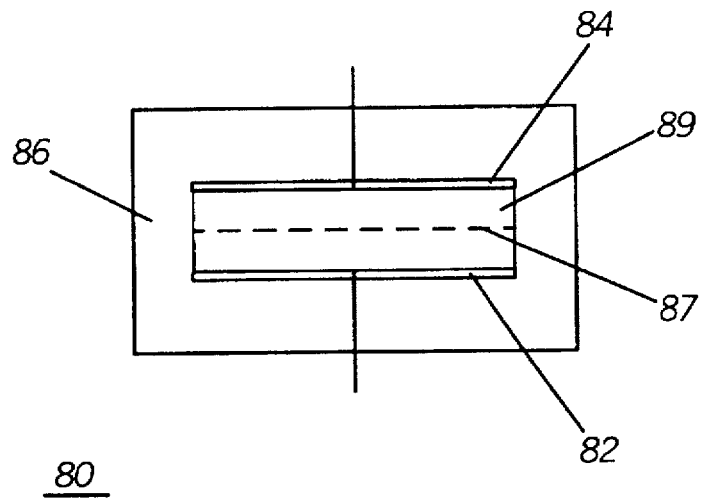
FIGS. 8 and 9 are cross sectional views of an energy storage device in accordance with the invention.

The preferred embodiment of an electrical energy storage device made with a porous organic electrode is shown in FIG. 8. The coated membrane provides a high surface area electrode. The ultracapacitor 80 is fabricated by placing two electrodes 82, 84 inside a housing 85 or other type of containment structure, in such a manner that the electrodes are situated so that the faces of the electrodes are parallel to each other, and so that a gap 86 is maintained between the electrodes. In some cases, the use of a separator material 87 is employed, in order to maintain the separation. Separators can be any number of porous materials, such as are normally used, for example, in the battery industry. An ionic electrolyte solution 89 is then disposed between the electrodes to fill the gap, and saturate the separator. Depending on the types of material used for the porous organic electrode, a dilute acid or a dilute base is used.

Figure 9:
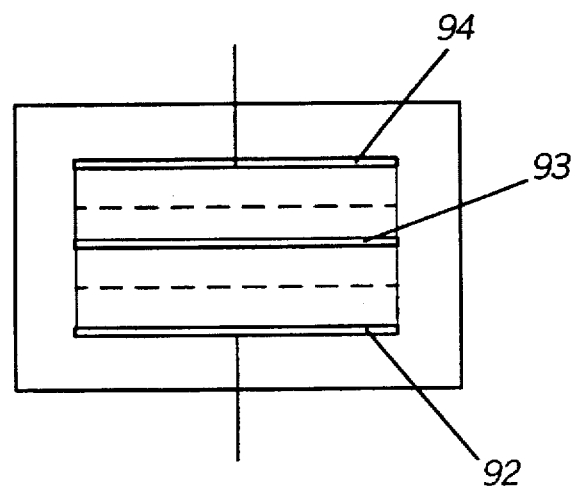

Examples of some suitable electrolytes are sulfuric acid ($H_2SO_4$), hydrochloric acid (HCl), and sodium hydroxide (NaOH) and sodium carobonate ($Na_2CO_3$). If the porous organic electrode is coated on only one side with the metal coating, then the electrode is situated so that the coated sides face each other. The ultracapacitor is now a sandwich of electrolyte between the two electrodes, with, optionally, a separator in between, all contained within a housing. In some situations, the housing would be optional, as for example, when the capacitor is built up using solid state materials. FIG. 9 shows an alternate embodiment of the invention, where both sides of a membrane electrode 93 are coated, to allow multiple cells to be built up by repeating the same layered structure, using two single sided electrodes 92, 94 as in the previous example. Alternatively, a jelly-roll cell (not shown) can be constructed by winding the two electrodes and the separator together and placing the roll in the housing. In this instance, the electrodes and the separator are formed in sheets. After placing in the housing, the electrolyte is added, and the cell is sealed.

In summary, it can be seen that thin films of metals, metal oxides, or metal carbides on microporous polymer membranes can serve to significantly enhance the surface area of an electrode that is useful in an electrical energy storage device, such as an ultracapacitor. These devices can store significantly higher amounts of electrical energy in a smaller package than those currently used in the conventional art. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrical energy storage device, comprising:

two electrodes, each comprising a film of a carboxylic ion-exchange material dispersed in a microporous copolymer matrix, the film supported on a woven nylon substrate; and a thin coating of one or more materials selected from the group consisting of aluminum, titanium, copper, tungsten, tantalum, nickel, rhodium, rhenium, and oxides or carbides thereof deposited in the microporous copolymer matrix;

said electrodes situated substantially parallel to each other, forming a gap between the electrodes; and an electrolyte disposed in the gap between the electrodes.

2. The electrical energy as described in claim 1, wherein the electrodes and the electrolyte is situated within a housing.

3. An ultracapacitor having microporous electrodes, comprising:

first and second electrode films each comprising a porous polystyrene divinylbenzene membrane;

the electrode films coated with a thin layer of metal oxide;

the electrode films situated substantially parallel to each other and forming a gap between them, a first major surface of the first electrode film facing a first major surface of the second electrode film; and an ionic electrolyte solution disposed in the gap between the electrode films.

4. The ultracapacitor as described in claim 3, further comprising an electrode separator disposed between the electrode films.

5. The ultracapacitor as described in claim 3, wherein the ionic electrolyte solution is a dilute solution of $H_2SO_4$, HCl, or NaOH.

6. The ultracapacitor as described in claim 3, wherein a second major surface of the electrode film is coated with a thin film of aluminum, titanium, copper, tungsten, or nickel.

7. The ultracapacitor as described in claim 3, wherein the metal oxide is one or more oxides selected from the group consisting of tantalum oxides, tungsten oxides, and titanium oxides.

8. An electrical energy storage device having a porous organic membrane electrode, comprising:

first and second electrodes, each comprising a microporous polymer substrate having first and second major surfaces and having a matrix of microporous openings, the first major surface and the walls of the microporous openings coated with a metal oxide;

said electrodes situated substantially parallel to each other and forming a gap between the electrodes, the first major surface of the first electrode facing the first major surface of the second electrode; and an ionic electrolyte solution disposed in the gap between the electrodes.

9. The electrical energy storage device as described in claim 8, further comprising an electrode separator situated between the electrodes and disposed in the electrolyte.

10. The electrical energy storage device as described in claim 8, wherein the electrolyte is a dilute solution of $H_2SO_4$, HCl, or NaOH.

11. The electrical energy storage device as described in claim 8, wherein the microporous polymer is polystyrene divinylbenzene.

* * * * *